US007624037B2

(12) United States Patent
Bost

(10) Patent No.: US 7,624,037 B2
(45) Date of Patent: Nov. 24, 2009

(54) ECONOMIC MODEL FOR MEASURING THE COST AND VALUE OF A PARTICULAR HEALTH INSURANCE PLAN

(75) Inventor: James Bost, Washington, DC (US)

(73) Assignee: NCQA, Washington, DC (US)

( * ) Notice: Subject to any disclaimer, the term of this patent is extended or adjusted under 35 U.S.C. 154(b) by 1055 days.

(21) Appl. No.: 10/284,452

(22) Filed: Oct. 31, 2002

(65) Prior Publication Data

US 2003/0149596 A1 Aug. 7, 2003

Related U.S. Application Data

(60) Provisional application No. 60/330,811, filed on Oct. 31, 2001.

(51) Int. Cl.
G06Q 50/00 (2006.01)
G06F 17/30 (2006.01)
(52) U.S. Cl. ............... 705/11; 705/2; 705/4; 705/7; 705/10
(58) Field of Classification Search ............ 705/4, 705/7, 11
See application file for complete search history.

(56) References Cited

U.S. PATENT DOCUMENTS 7,376,574 B2 * 5/2008 Toan et al. ............... 705/4
2002/0049617 A1 * 4/2002 Lencki et al. ............ 705/4

OTHER PUBLICATIONS

Burton et al., The role of Health Risk Factors and Disease on Worker Productivity, J. Occup. Environ. Med., vol. 41, Issue 10 (Oct. 1999), p. 863-77.*

Maxwell et al., Managed Competition in Practice: 'Value Purchasing' by Fourteen Employers Are large employers the new champions of managed competition?, Health Affairs, vol. 17, No. 3, May/Jun. 1998.*

(Continued)

*Primary Examiner*—Beth V Boswell
*Assistant Examiner*—Justin M Pats
(74) *Attorney, Agent, or Firm*—Hogan & Hartson, LLP

(57) ABSTRACT

The present invention provides a system and method for measuring the relative economic benefits from services offered by health care plans. The present invention quantifies value of health care quality by indicating an economic return on the investment in health care quality, enabling organizations and businesses to view health care quality in a familiar paradigm that extends health plan differentiation beyond premium and benefits. Businesses may employ the present invention to compare different health care plans or classes of plans, such as accredited versus non-accredited plans. Specifically, a particular plan or class of plans may provide improved monitoring, treatment and control of various medical conditions, and the present invention quantifies the economic benefits to employers from the improved health care for employees. In one embodiment, the present invention looks to a set of specific medical conditions and is based on three key steps. First, the present invention identifies the overall level of employees at the organization affected by these conditions. Second, the present invention uses the reduction in absenteeism and low productivity days made possible by improved monitoring and control of the medical conditions. Third, the present invention calculates a monetary valuation to the firm of the reduction in absenteeism and low productivity days based on the firm's average revenue per employee, average daily wage, and other parameters.

37 Claims, 12 Drawing Sheets

OTHER PUBLICATIONS

Berger et al., Alternative Valuations of Work Loss and Productivity, J. Occup. Environ.Med., vol. 43, Issue 1 (Jan. 2001), p. 18-24.*

Cockburn et al., Loss of Work Productivity due to Illness and Medical Treatment, J. Occup. Environ.Med., vol. 41, Issue 11 (Nov. 1999), p. 948-53.*

Menon and Assiff, The Burden of illness of Employees on United States Employers: A Critical Review of the Literature, Drug Information Journal, vol. 34, pp. 47-58, 2000.*

Barringer et al., Predicting Employee Health Insurance Selections in a Flexible Benefits Environment, Cornell University, 1991, p. 1-34.*

Greenberg et al., Economic Consequences of Illnesses in the Workplace, Sloan Management Review, vol. 36, No. 4, Summer 1995, p. 26-38.*

Peters et al., The Cost of Productivity Losses Associated With Allergic Rhinitis, Am J Manag Care, vol. 6, 2000, p. 373-78.*

Druss et al., Health and Disability Costs of Depressive Illness in a Major U.S Corporation, Am J Psychiatry, vol. 157, 2000, p. 1274-78.*

Thompson et al., the NCQA's Quality Compass: Evaluating Managed Care In the United States, Health Tracking: Trends, Health Affairs, vol. 17, No. 1, p. 152-158.*

* cited by examiner

Calculate relative change in absenteeism and lost productivity caused by differences in health plans
300

→ Calculate the reduction in absentee days and lower productivity when conditions are well controlled — 310

↓

Calculate the relative difference in the control of each of the conditions — 320

↓

Determine total changes in absenteeism and low productivity days, — 330

FIGURE 3

Calculate value to
organization of the
change in absenteeism
and low productivity
400

Calculate the total reduction in absenteeism and lower productivity — 410

Calculate monetary value per employee of lost labor — 420

Calculate monetary value of total reduction in lost labor — 430

FIGURE 4A

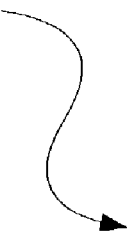
Calculate monetary value per employee of lost work day
420
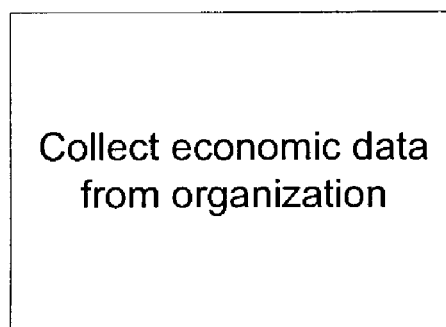
Collect economic data from organization
422
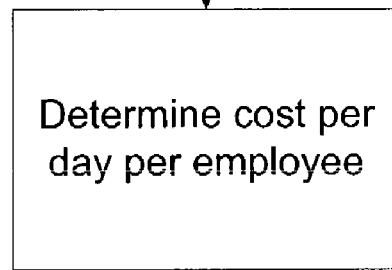
Determine cost per day per employee
424
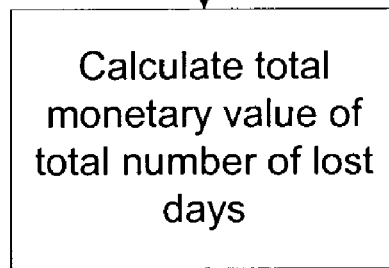
Calculate total monetary value of total number of lost days
426
FIGURE 4B

|         | Under 30 | 30 - 44 | 45 - 54 | 55 - 64 | 65 & Over | Totals |
|---------|----------|---------|---------|---------|-----------|--------|
| Please enter estimates of your employee population | | | | | | |
| Female  | 897      | 1,580   | 884     | 397     | 111       | 3,868  |
| Male    | 468      | 1,027   | 624     | 358     | 156       | 2,633  |
| Totals  | 1,365    | 2,607   | 1,508   | 754     | 267       | 6,500  |

If you don't know population by age and gender, enter the total full-time count and click on the appropriate industry ⇒ Total number of full-time employees: 6,500

| | |
|---|---|
| Enter average employee daily wage | $125.00 |
| Enter benefits overhead rate | 25% |
| Average daily employee cost is | $156.25 |
| Enter average additional overhead rate to reflect replacement costs in training, increased supervision, and other replacement costs | 10% |
| Average daily replacement cost | $171.88 |

| | |
|---|---|
| Enter annual revenue of company | $650,000,000 |
| Enter possible annual days worked | 260 |
| Enter number of vacation & personal days | 15 |
| Enter number of paid holidays | 10 |
| Enter average number of sick days | 20 |
| Average daily revenue per employee | $465.12 |
| Enter percent loss of revenue per employee if absent employee is not replaced | 50% |
| Daily revenue loss from absent employee that is not replaced | $232.56 |

Enter the average percentage of workers that are replaced when absent. (For example, 80%.) The percentage of absent workers that are not replaced will impact revenues ⇒ Percent of absent workers that are replaced: 80%

| Prevalence/1000 | Female | | | | |
|---|---|---|---|---|---|
| | Under 30 | 30 - 44 | 45 - 54 | 55 - 64 | 65 & Over |
| Depression | 38.0 | 58.0 | 31.0 | 31.0 | 12.0 |
| Asthma | 48.0 | 48.0 | 50.6 | 50.6 | 44.3 |
| Diabetes | 13.4 | 13.4 | 56.2 | 56.2 | 106.9 |
| Chicken Pox | 74.3 | 75.3 | 39.1 | 8.7 | 1.5 |
| Heart Disease | 10.4 | 10.4 | 52.5 | 52.5 | 203.2 |
| Hypertension | 22.6 | 22.6 | 181.8 | 181.8 | 235.5 |
| Pregnancy | 108.3 | 44.0 | 0.2 | 0.0 | 0.0 |
| Smoking | 218.0 | 268.0 | 240.0 | 240.0 | 115.0 |

HEDIS scores: Accredited plan averages v. nonaccredited plan averages

| | | Accred Mean | Not Accred Mean | Difference |
|---|---|---|---|---|
| Diabetes | Rate - HbA1c Testing | 77.0% | 72.5% | 4.5% |
| | Rate - Poor HbA1c Control | 43.5% | 46.6% | -3.1% |
| | Rate - Eye Exams | 49.4% | 39.9% | 9.5% |
| | Rate - Lipid Profile | 71.3% | 66.1% | 5.2% |
| | Rate - Lipid Control | 39.1% | 33.4% | 5.7% |
| | Rate - Monitoring Diabetic Nephropathy | 38.0% | 33.6% | 4.4% |

| Category | Affected Employees | Poor Control | | Good Control | | Savings | |
|---|---|---|---|---|---|---|---|
| | | Average Absences (Days) | Productivity Loss (Days) | Average Absences (Days) | Productivity Loss (Days) | Average Absences (Days) | Productivity Loss (Days) |
| Depression | 212 | 43.00 | 9.40 | 23.57 | 7.29 | 19.43 | 2.11 |
| Asthma | 275 | 21.20 | 34.93 | 10.60 | 17.47 | 10.60 | 17.47 |
| Diabetes | 201 | 12.00 | 4.02 | 2.50 | 1.52 | 9.50 | 2.50 |
| Chicken Pox | 342 | 1.68 | 0.00 | 0.00 | 0.00 | 1.68 | 0.00 |
| Heart Disease | 257 | 14.69 | 22.90 | 9.80 | 14.02 | 4.89 | 8.88 |
| Hypertension | 500 | 6.50 | 7.18 | 4.90 | 5.57 | 1.60 | 1.61 |
| Pregnancy | 167 | 1.00 | 1.00 | 1.00 | 1.00 | 0.00 | 0.00 |
| Smoking | 1,671 | 2.00 | 2.50 | 1.95 | 2.44 | 0.05 | 0.06 |

| Category | Affected Employees | Per Capita Savings | | NCQA Accred. Multiplier | Total Absentee Days Gained | Total Productivity Days Gained |
|---|---|---|---|---|---|---|
| | | Average Absences (Days) | Productivity Loss (Days) | | | |
| Depression | 212 | 19.43 | 2.11 | 0.029 | 117.5 | 12.8 |
| Asthma | 275 | 10.60 | 17.47 | 0.018 | 52.6 | 86.6 |
| Diabetes | 201 | 9.50 | 2.50 | 0.044 | 83.9 | 22.1 |
| Chicken Pox | 342 | 1.68 | 0.00 | 0.039 | 22.4 | 0.0 |
| Heart Disease | 257 | 4.89 | 8.88 | 0.063 | 79.3 | 144.0 |
| Hypertension | 500 | 1.60 | 1.61 | 0.028 | 22.4 | 22.5 |
| Pregnancy | 167 | 0.00 | 0.00 | 0.065 | 0.0 | 0.0 |
| Smoking | 1,671 | 0.05 | 0.06 | 0.050 | 3.8 | 4.8 |
| | | | | | 381.8 | 292.8 |

FIGURE 10

ECONOMIC MODEL FOR MEASURING THE COST AND VALUE OF A PARTICULAR HEALTH INSURANCE PLAN

RELATED APPLICATIONS

This application claims priority from U.S. Provisional Application Ser. No. 60/330,811, filed Oct. 31, 2001, the disclosure of which is hereby incorporated by reference in its entirety.

FIELD OF THE INVENTION

The present invention relates to a system and method for measuring the relative economic benefits of certain health insurance plans in comparison to other health insurance plans.

BACKGROUND OF THE INVENTION

When selecting health care plans to offer to employees, businesses are faced with a myriad of potential choices. Selecting from health care plans is a complex decision because each of the plans typically offers different mixes of services and costs to businesses and their employees. To assist businesses in making these decisions, health care plans may be grouped together into classes offering similar sets or types of services, thereby allowing businesses to compare plans offering relatively comparable services. For instance, plans may be grouped into an "accredited" class if they are reviewed by the National Counsel for Quality Assurance (NCQA) and meet certain standards. See www.NCQA.org for more information on accreditation of health plans. However, when comparing two classes of health care plans, businesses must still perform relatively complicated cost-to-benefit analyses. For instance, accredited plans may offer more health care services at a higher cost relative to non-accredited plans. The business must then assess whether the additional benefits and services of the accredited plans justify the additional costs.

While the process of comparing direct costs and services is relatively straightforward, it may be difficult and expensive for a business to measure indirect economic benefits from services offered by a class of health care plans. In particular, providing a certain service, despite adding additional costs, may be economically advantageous to a business. For example, improved employee health provided by particular health care services may benefit a business by increasing employee productivity and lowering absenteeism rates.

SUMMARY OF THE INVENTION

In response to these and other needs, the present invention provides a system and method for measuring the relative economic benefits from services offered by health care plans. The present invention quantifies value of health care quality by indicating an economic return on the investment in health care quality, enabling organizations and businesses to view health care quality in a familiar paradigm that extends health plan differentiation beyond premium and benefits. Businesses may employ the present invention to compare different health care plans or classes of plans, such as accredited versus non-accredited plans. Specifically, a particular plan or class of plans may provide improved monitoring, treatment and control of various medical conditions, and the present invention quantifies the economic benefits to employers from the improved health care for employees.

In one embodiment, the present invention looks to a set of specific medical conditions and is based on three key steps. First, the present invention identifies the overall level of employees at the organization affected by these conditions. Second, the present invention uses the reduction in absenteeism and low productivity days made possible by improved monitoring and control of the medical conditions. Third, the present invention calculates a monetary valuation to the firm of the reduction in absenteeism and low productivity days based on the firm's average revenue per employee, average daily wage, and other parameters. Alternatively, the present invention uses a similar methodology to determine the economic benefits to an organization from other aspects of a health insurance plan, such as its administrative burden or costs to employees.

The medical conditions currently covered in the present invention include asthma, hypertension, heart disease, childcare conditions (such as the incidence of chicken pox), depression, diabetes, and smoking-related conditions. The present invention may also incorporate other medical conditions, such as maternal health and the effects of co-morbidities associated with having more than one condition. The present invention integrates various research results related to prevalence rates, efficacy of measurement and control efforts, and other aspects. Also, the present invention can be modified to reflect new, relevant research, increases in coverage and the sophistication of health services measurement.

The present invention may provide a calculation of employer-specific results. For instance, results from the present invention may be customized for employer size, basic workforce demographics, average wages, and other organization-specific factors such as age/gender distributions. By measuring the financial and operational results from the impact provided by a class of plans, such as accredited plans, organizations may better evaluate the cost/benefit equation when selecting health plan coverage for employees.

In another embodiment, the present invention may be a software-based system having a series of linked, interactive spreadsheets or web pages to gather information and implement the above-described software. Through these displays, an organization supplies certain demographic and business information about its employees. Specifically, input from the organization characterizes its workforce size and demographic makeup. The input may be further used to establish revenue per employee and wages per employee. The system uses these inputs to predict the potential changes in absenteeism and low productivity days as a result of coverage by a specific health plan or class of health plans. The system further calculates the dollar impact to the organization attributable to these changes in absenteeism and low productivity days. The results of these calculations may then be graphically displayed.

BRIEF DESCRIPTION OF THE DRAWINGS

These and other advantages of the present invention are described more fully in the following drawings and accompanying text in which like reference numbers represent corresponding parts throughout:

FIGS. 1-4B are flowcharts that depict the steps in a method for measuring the economic value of differences in health insurance in accordance with embodiments of the present inventions;

FIGS. 6-11 are schematic illustrations of possible graphical displays that may be produced by the system of FIG. 5 in accordance with embodiments of the present invention.

DETAILED DESCRIPTION OF THE PREFERRED EMBODIMENT

Figure 1:
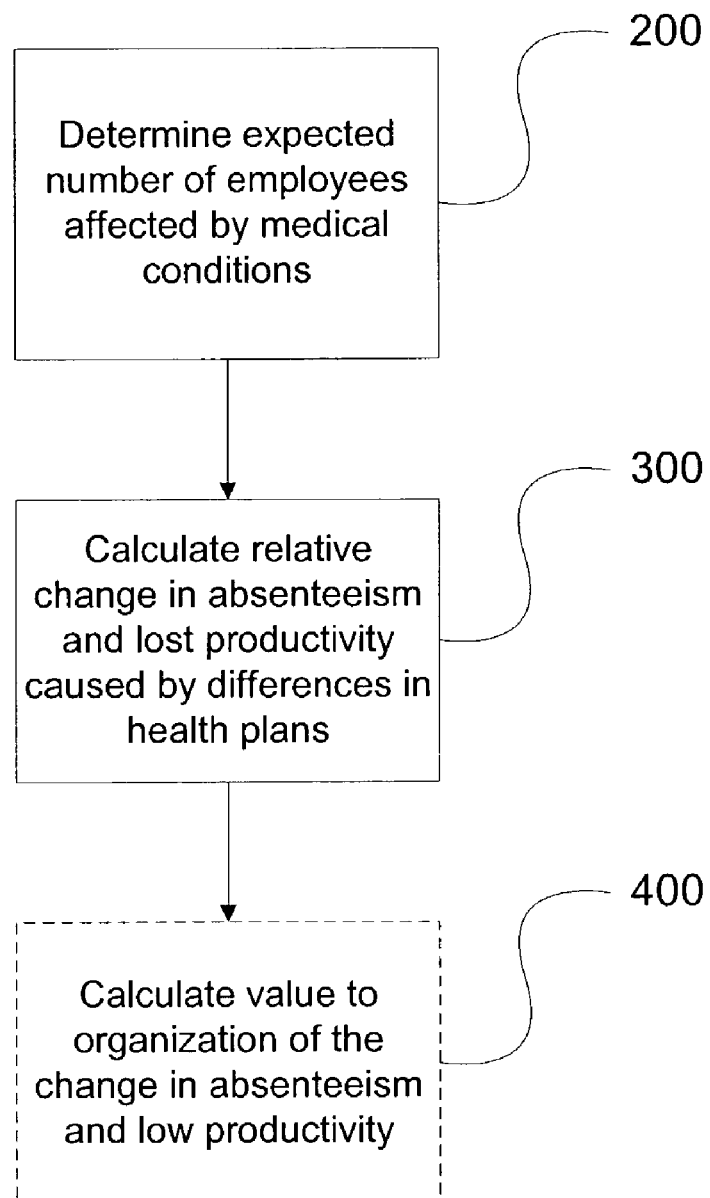

As depicted in FIG. 1, the present invention provides a method 100 for an economic evaluation of the relative benefits of a health care plan or group of plans. The steps in economic evaluation method 100 include determining the expected number of employees affected by medical conditions of interest, step 200, and calculating the relative change in the labor lost brought about by a health care plan, step 300. Optionally, the economic evaluation method 100 may further include a dollar valuation of the relative change in labor lost calculated in step 300.

Figure 2A:
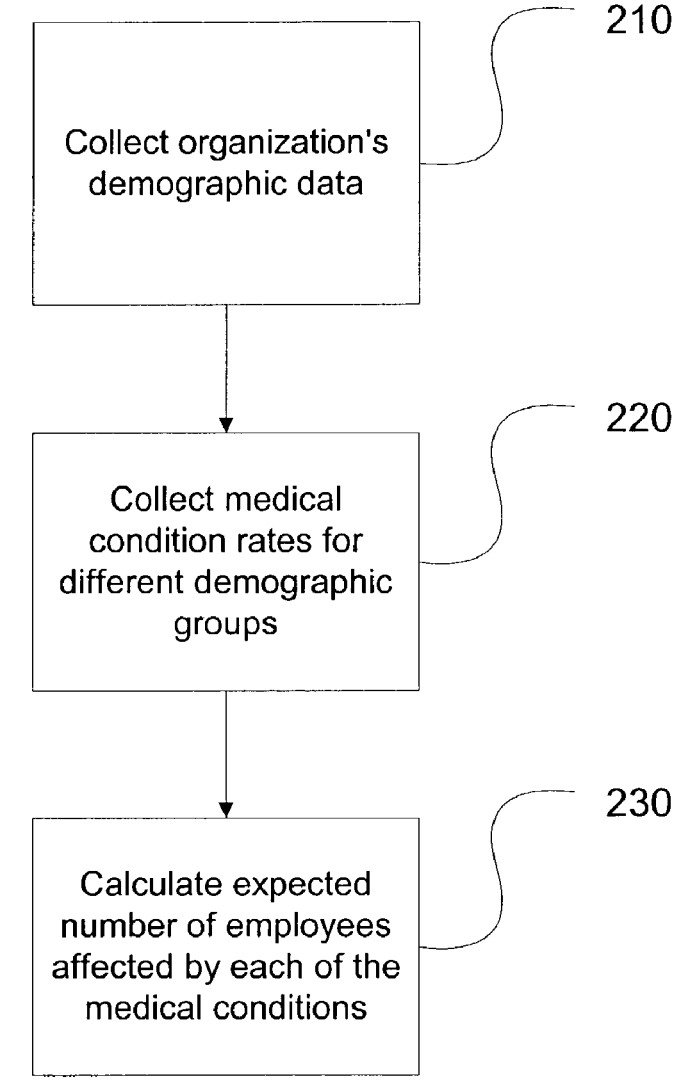

Turning now to FIG. 2A, the determination of the expected number of employees affected by various medical conditions in step 200 predicts the number of an organization's workers afflicted by these conditions. Step 200 generally entails a collection of information on the organization's workforce in step 210, collecting rates of occurrence for the medical conditions for different demographic groups in step 220, and calculating the expected number of employees affected by each of the medical conditions in step 230.

Figure 2B:
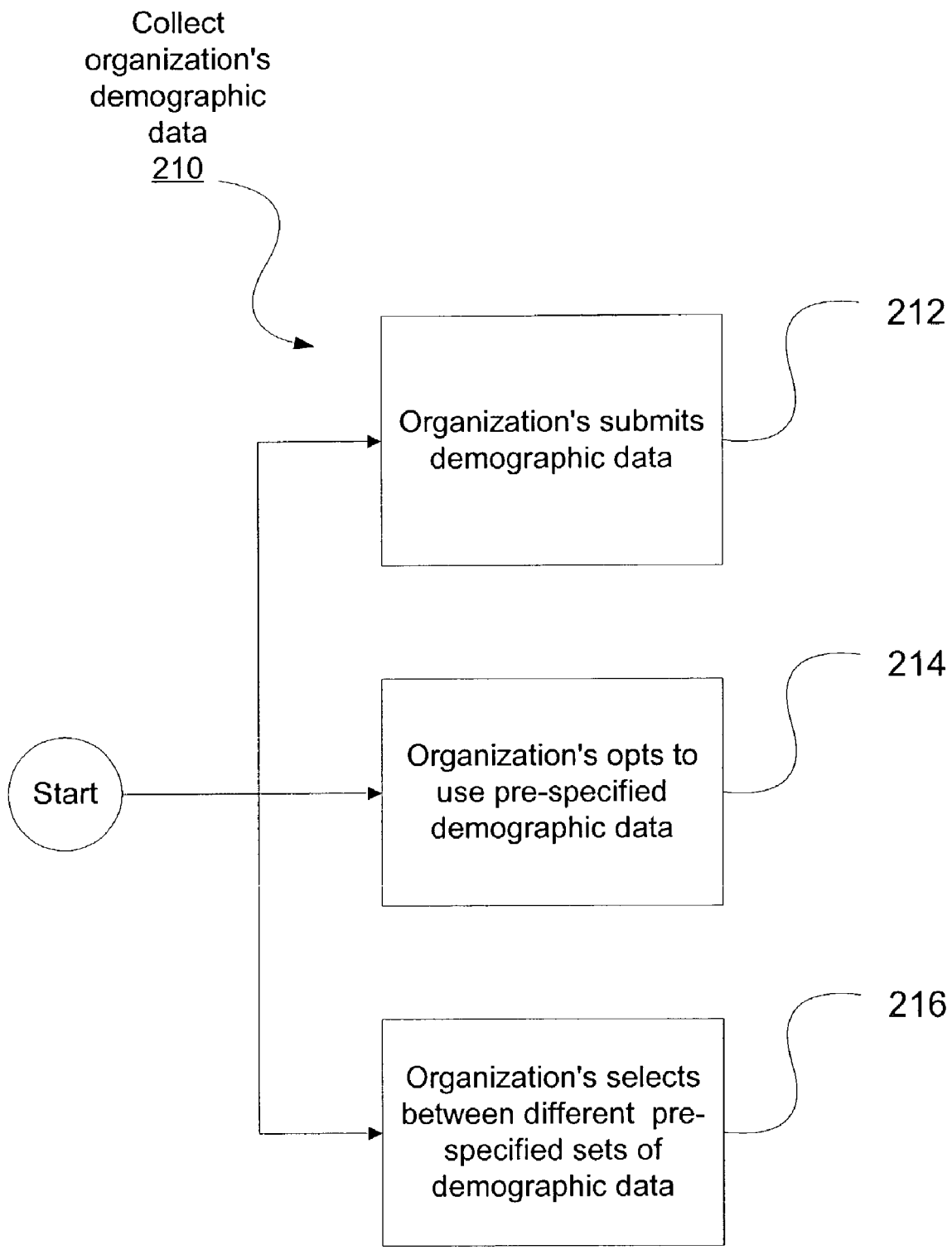

As depicted in FIG. 2B, during the collection of organization data in step 210, the organization preferably provides information related to the demographics of its employees, step 212. In step 212, the organization may provide various types of demographic information, including the number of full-time employees and the age/gender distribution of the employees. The employer enters estimates of their employee populations in various age/gender cohorts. In a preferred implementation, the employer enters estimates of their employee populations in ten age and gender cohorts.

The organization may provide the demographic data using a data form 600 depicted in FIG. 6. Using the data form 600, the organization may enter estimates of their employee populations in various age/gender cohorts. As described below, the present invention uses demographics to calculate productivity and absenteeism effects based on an overall workforce age/gender distribution.

If an organization cannot or does not wish to provide the demographic information on its employees, such as the age and gender distributions, the organization may alternatively use default, pre-programmed distributions for some or all of the demographic information, step 214. Generally, the organization may specify its number of employees without providing their age and gender distributions. Demographic data is then extrapolated according to the number of employees. In this way, the use of default demographic data allows an organization to preserve confidential information and does not require that the organization know the age/gender distribution of their workforce. The use of default values allows an organization to potentially sacrifice some accuracy for ease of use.

Continuing with FIG. 2B, the organization may also choose between different sets of default values, step 216 or may otherwise provide information to modify the default workforce data values. In this way, the organization may preserve the accuracy of the economic valuation without providing extensive information on the organization's workforce. In one embodiment, the organization may specify the field of its operations or the organization may select a set of values corresponding to a field of operation. For instance, an organization may choose from default population distributions associated with various industry segments. In this way, the present invention may use extrapolated demographic data that is tailored to an industrial group instead of an overly broad, general estimate. For example, the present invention may be customized using employee demographic data for businesses in fields of 1) manufacturing; 2) retail trade; and 3) finance, insurance and real estate. The data for these and other industry groups may be obtained from the Bureau of Labor Statistics (BLS) Standard Industry Codes. More information regarding the BLS Standard Industry Codes is provided at http://www.bls.gov/oes/home.htm.

Returning to FIG. 2A, the next task in determining the expected number of the employees affected by medical conditions of interest in step 200 is collecting rates of occurrence for different demographic groups, step 220. The prevalence of various medical conditions is provided below, in Tables 1-7. The present invention incorporates current research available with respect to prevalence rates, efficacy of measurement and control efforts, and other aspects. Furthermore, it should be appreciated that the present invention can grow to reflect new research, increases in coverage, and increases in the sophistication of health services measurement.

Medical conditions of interest include asthma, hypertension, heart disease, childcare conditions (such as the incidence of chicken pox), depression, diabetes, and smoking-related conditions. It should be appreciated that the present invention may also incorporate other medical conditions, such as maternal health and the effects of co-morbidities associated with having more than one condition.

The prevalence rates for different medical conditions for different age and gender cohorts may be displayed to the organization. As illustrated in FIG. 7, the present invention may present a prevalence spreadsheet 700 showing the prevalence of the various medical conditions in various demographic groups. For instance, the spreadsheet in FIG. 7 shows the prevalence of several conditions in several age groups of women.

The analysis of these medical conditions is now described in greater detail. The following descriptions describe statistical rates of prevalence for several different medical conditions: asthma, hypertension, heart disease, childcare conditions, such as the incidence of chicken pox, depression, diabetes, and smoking-related conditions. The following descriptions further provide statistical estimates for absenteeism and productivity losses caused by these conditions. Again, it should be noted that the present invention might incorporate data for other conditions as well. Similarly, it should be appreciated that the statistical estimates found in the following descriptions may be replaced with other results by someone of reasonable skill in the field of economic modeling without deviating from the intent and scope of the present invention.

The discussions of the medical conditions also describe the creation of a multiplier, the use of which is described in greater detail below in the text accompanying step 320. The multiplier indicates the relative proportion of health plan members having a medical condition that is well controlled. The multiplier is designed to be the quantification of the relative value of the health care plan or class of health care plans and is derived from various empirical studies. For example, the relative economic benefits from accredited health care plans may be estimated using scores produced in the Health Plan Employer Data and Information Set (HEDIS®) developed by the National Committee for Quality Assurance (NCQA) and in the Consumer Assessment of Health Plans (CAHPS®) developed by the Agency for Health Care Policy and Research (AHCPR). Specifically, the multiplier formed using these data sets represents the different treatment rates between accredited plans and non-accredited plans for various conditions. For more information on HEDIS, see http://www.ncga.org/Programs/HEDIS/, the contents of which are incorporated by reference.

Depression

Depression is a well-studied condition in which the productivity and absentee effects have been examined. A number of articles are reviewed for this measure. The primary reference is the below-listed Greenberg article, which surveys many seminal works in this area, principally in the Stoudemire and Weissman references. The figures used in Greenberg are directly applicable to the present invention. The numbers used in the present invention are in keeping with Greenberg and generally use the most conservative figures cited.

The following references are particularly relevant to depression rates as used in the present invention and are hereby incorporated by reference.
1) Greenberg P E, Stiglin L E, Finkelstein S N, Berndt E R., "The Economic Burden of Depression in 1990," *Journal of Clinical Psychiatry* November 1993; 54:11 405-418.
2) Claxton A J, Chawla A J, Kennedy S. "Absenteeism Among Employees Treated for Depression," *Journal of Occupational and Environmental Medicine* July 1999; 41:7 605-611.
3) Stoudemire A, Frank R, Hedemark N, Kamlet M, Blazer D. "The Economic Burden of Depression." *General Hospital Psychiatry* 1968; 8: 387-394.
4) Weissman M M, Bruce M L, Leaf P J, et al. "Affective disorders" In: Robins L N, Regier D A, eds. *Psychiatric Disorders in America*. New York, N.Y.: The Free Press; 1991.

Table 1 provides prevalence (rate per 1,000) of depression in different demographic groups. The prevalence rates contained in Table 1 are obtained from Table 3 of the Greenberg reference.

TABLE 1

|  | Under 30 | 30-44 | 45-54 | 55-64 | Over 64 |
|---|---|---|---|---|---|
| Female | 38.0 | 58.0 | 31.0 | 31.0 | 12.0 |
| Male | 20.0 | 20.0 | 15.0 | 15.0 | 5.0 |

With depression, an expected number of absent workdays is 43 per untreated episode (no control). This number represents lost days of 60.2 converted to workdays by multiplying by $5/7$. In contrast, the number of absent workdays for good control is 23.57, which is 33 lost days converted to workdays by multiplying by $5/7$. This data also comes from the Greenberg reference, table 4; columns 4 and 13. The Claxton article also had estimates for absentee days, but the Greenberg reference contained more conservative estimates.

Productivity impairment is 20% during the episode period of depression. The figures are calculated based on the number of workdays in the episode. Again, this number comes from Greenberg reference, table 4 (describing episode length in columns 10 and 1 and lost days in columns 13 and 4). Accordingly:

Episode length−lost days=remaining days
Remaining days*$5/7$=remaining workdays
Remaining workdays*0.2=productivity loss in days So,
Poor Control $((126-60.2)*(5/7))*0.2=9.2$, and
Good Control $((84-33)*(5/7))*0.2=7.29$ The estimate of 20% is based also on Greenberg, page 416, top of column 2. Note that the Greenberg article cites many previous studies and uses a conservative estimate based on those other studies.

There are four HEDIS measurements associated with depression:
Antidepressant Rate, Acute Phase
Antidepressant Rate, Continuation Phase
Antidepressant Rate, Visit Rate
Mental Health Follow-Up Visit, 30 days For the multiplier, the difference between the average accredited and non-accredited plans is calculated and then these differences are averaged.

For more information on the rates related to depression, look to:
1) Glozier N. "Workplace Effects of the Stigmatization of Depression," *Journal of Occupational and Environmental Medicine* September 1998; 40:9 793-800.
2) Grosch J W, Murphy L R. "Occupational Differences in Depression and Global Health Results From a National Sample of US Workers," *Journal of Occupational and Environmental Medicine* February 1998; 40:2 153-164. Conti D J, Burton W N. "The Economic Impact of Depression in a Workplace," *Journal of Occupational and Environmental Medicine* September 1994; 36:9 983-988. (not included)
3) Vernarec E. "Depression in the Workplace, Seeing the Cost in a Fuller Light," *Business & Health* April 2000; 18:4 48-52, 55.
4) Regier D A, Narrow W E, Rae D S, Manderscheid R W, Locke B Z, Goodwin F K. "The de Facto US Mental and Addictive Disorders Service System: Epidemiologic Catchment Area Prospective 1-Year Prevalence Rates of Disorders and Services," *Archives of General Psychiatry* February 1993; 50: 85-93.
5) Wells K B, Stewart A, Hays R D, Burnam M A, Rogers W, Daniels M, Berry S, Greenfield S, Ware J. "The Functioning and Well-Being of Depressed Patients: Results From the Medical Outcomes Study," *JAMA* Aug. 18, 1989; 262:7 914-919.
6) Berndt E R, Bailit H L, Keller M B, Verner J C, Finkelstein S N. "Health Care Use and At-Work Productivity Among Employees With Mental Disorders," *Health Affairs* July/August 2000; 19:4 244-255.
7) Mintz J, Mintz L I, Arruda M J, Hwang S S. "Treatments of Depression and the Functional Capacity to Work," *Archives of General Psychiatry* October 1992; 49: 761-768.
8) Simon G E, Barber C, Birnbaum H G, et al. "Depression and Work Productivity: The Comparative Costs of Treatment Versus Nontreatment," *Journal of Occupational and Environmental Medicine* January 2001; 2-9.
9) Druss B G, Schelsinger M, Allen H M. "Depressive Symptoms, Satisfaction with Health Care, and 2-Year Work Outcomes in an Employed Population." *American Journal of Psychiatry* May 2001; 158:5 731-734.

Asthma

The below-listed Krahn reference is a comprehensive look at indirect costs of asthma in Canada in 1990. The data is presented in a way in which we can derive case-specific absentee and productivity estimates. The discussion in the article and a comment by Weiss state that the indirect unit cost structure is the same for Canada and the United States. The differences to consider are monetary scaling effects. U.S. vital statistics for the U.S. prevalence rates are used in the determination of the number of affected employees. In determining case level absentee and productivity effects, the 1997 Canadian asthma prevalence rate is 6.2%. Earlier Canadian asthma prevalence rates are not available; as it is well documented that asthma prevalence rates are rising. Therefore, it is assumed that the 1990 rate is slightly lower. This would impart a slight downward bias on the estimates used in the present invention, which is in keeping with the conservative approach of the present invention. The known increasing prevalence rates for asthma also lead to an understatement of the number of affected employees as the U.S. Vital Statistics used are from 1990 to 1992. Once again, this potential downward bias is in line with a conservative approach.

The following references are particularly relevant to asthma data as used in the present invention and are hereby incorporated by reference:

1) Vital and Health Statistics. Prevalence of Selected Chronic Conditions: *United States, 1990-1992, Series* 10 *Data from the National Health Survey No.* 194, Tables 9, 10.
2) Krahn M D, Berka C, Langlois P, Detsky A S. "Direct and Indirect Costs of Asthma in Canada, 1990," *Canadian Medical Association Journal* March 1996; 154:6 821-831.
3) Serra-Batlles J, Plaza V, Morejon E, Comella A, Brugues J. "Costs of Asthma According to the Degree of Severity," *European Respiratory Journal* 1998; 12: 1322-1326.
4) Barnes P J, Jonsson B, Klim J B. The Costs of Asthma, European Respiratory Journal 1996; 9: 636-642.
5) Weiss K B, Gergen P J, Hodgson T A. An Economic Evaluation of Asthma in the United States, New England Journal of Medicine 1992; 326:13 862-866.
6) Health Canada Bureau of Cardio-Respiratory Diseases & Diabetes, Documents and Publications, "The Prevention and Management of Asthma in Canada: A Major Challenge Now and in the Future" (published by the National Asthma Control Task Force and available at http://www.hc-sc.gc.ca/hpb/lcdc/publicat/asthma00/pdf/asthma00e.pdf.)

Asthma prevalence (rate per 1,000) for different demographic groups is summarized in the following Table 2:

TABLE 2

|  | Under 30 | 30-44 | 45-54 | 55-64 | Over 64 |
|---|---|---|---|---|---|
| Female | 48.0 | 48.0 | 50.6 | 50.6 | 44.3 |
| Male | 34.2 | 34.2 | 31.6 | 31.6 | 30.6 |

The data in Table 2 is obtained from U.S. Vital and Health Statistics.

Absenteeism per asthmatic employee is typically 21.20 days per year. This derived estimate of 21.2 absentee days is obtained from the Krahn reference and is less than Serra-Batlles reference's estimate of 25.71. Table 1 of Krahn cites the Canadian Health Survey (CHS) and the Ontario Health Survey (OHS). Krahn uses MAL or Major Activity Loss a measure of interest, (see page 824, top of left column for definition of this measure). The MAL days presented are per 1,000 of total population per year. The per capita rates for the effected population must be calculated. The calculation requires that a total population per capita rate be calculated and then adjusted to cover only those with asthma (multiply by the reciprocal of the prevalence rate). Prevalence rates vary across publications from 4.5% (U.S. Vital Statistics reference) to 7% (Szucs reference). Furthermore, the rates are increasing as seen in the Farber reference. The present invention uses a prevalence rate of 6.2% in the calculations for absentee days. This is based on the Canadian 1996/97 National Population Health Survey as reported in The Prevention and Management of Asthma in Canada: A Major Challenge Now and in the Future, page 6. While asthma prevalence rates are increasing, the minimal change from 1990 to 1996 will impart a slight downward effect on the estimates on absenteeism and productivity. Therefore, the use of a 6.2% prevalence rate is in keeping with a conservative estimation approach.

MAL Days

CHS (1348/1000)=1.348*(100/6.2)=21.74
OHS (1281/1000)=1.281*(100/6.2)=20.66
Average=21.20

The level of the lost productivity is 34.93 days per asthmatic per year, the average in CHS and OHS values in the Krahn reference. Specifically, Krahn indicates through the weighting method used that 50% of "cut down days" translate to missed work (page 824, par. 1). Weiss 1992 also indicates that the work loss effect is the sum of actual workdays plus 50% of the reduced activity days (page 863, column 2, par. 1). The days in the model are calculated using Krahn's Table 1 figures using the same method as absentee days above.

CHS (2859/1000)=2.859*(100/6.5)*0.5=23.06
OHS (5802/1000)=5.802*(100/6.5)*0.5=46.79
Average=34.93

Good control of asthma results in a 50% improvement due to a decrease in severity level. This value is from the Barnes reference, which sums up the benefits of improved control by looking at a few studies comparing costs of different severity levels of asthma, see page 640, par. 3-4, and page 641, Conclusion, par. 2-3. The Serra-Batlles reference at page 1324, par. 2, also indicates that moderate asthma incurs 1.6 times more indirect cost than mild, and severe 3.8 times higher indirect cost than moderate.

With asthma, the multiplier is the difference between the average accredited plan score and average non-accredited plan score in the all ages HEDIS Asthma Medication rate.

For more information on the rates related to asthma, please refer to:

1) Legorreta A P, Leung K W, Berkbigler D, Evans R, Liu X. "Outcomes of a Population-Based Asthma Management Program: Quality of Life, Absenteeism, and Utilization," *Annals of Allergy, Asthma, & Immunology* 2000; 85: 28-34.
2) Gassert T, Hu H, Kelsey K T, Christiani D C. "Long-Term Health and Employment Outcomes of Occupational Asthma and Their Determinants," *Journal of Occupational and Environmental Medicine*, May 1998; 40:5 481-491.
3) Diette G B, Markson L, Skinner E A, Nguyen T T H, Algatt-Bergstrom P, Wu A W. "Nocturnal Asthma in Children Affects School Attendance, School Performance, and Parents' Work Attendance," *Archives of Pediatrics & Adolescent Medicine* September 2000; 154:9 923-928.
4) Ungar W. "Calculating the Cost of Asthma in Canada," *Canadian Medical Association Journal* 1996; 155: 862-864.
5) Szucs T D, Anderhub H, Rutishauser M. "The Economic Burden of Asthma: Direct and Indirect Costs in Switzerland," *European Respiratory Journal* 1999; 13: 281-286.
6) Weiss K B, Sullivan S D. "Understanding the Costs of Asthma: The Next Step," *Canadian Medical Association Journal* 1996; 154: 841-843.
7) Weiss K B, Sullivan S D, Lyttle C S. "Trends in the Cost of Illness for Asthma in the United States, 1985-1994," *Journal of Allergy and Clinical Immunology* September 2000; 106:3 493-499.
8) Farber H J, Wattigney W, Berenson G. "Trends in Asthma Prevalence: the Bogalusa Heart Study," *Annals of Allergy, Asthma & Immunology* March 1997; 78: 265-269.

9) Burton W N, Connerty C M, Schultz A B, et al. "Bank One's Worksite-Based Asthma Disease Management Program." *Journal of Occupational & Environmental Medicine* February 2001 75-82.

10) Mannino D M, Homa D M, Pertowski C A, et al. "Surveillance for Asthma United States, 1960-1995." *In CDC Surveillance Summaries*, Apr. 24, 1998. MMWR 1998; 47 (No. SS-1):1-28.

Diabetes

The Diabetes literature is rich with information on prevalence rates, lost works days of diabetics, and the effects of improved care on lost workdays. In one embodiment, the present invention primarily used data from the below-listed Testa reference, from which needed figures are directly derived.

The following references are particularly relevant to diabetes as used in the present invention and are hereby incorporated by reference:

1) *Vital and Health Statistics*. "Prevalence of Selected Chronic Conditions: United States, 1990-1992," Series 10 Data from the National Health Survey No. 194 Tables 37, 38.

2) Testa M A, Simonson D C. "Health Economic Benefits and Quality of Life During Improved Glycemic Control in Patients With Type 2 Diabetes Mellitus." *Journal of the American Medical Association (JAMA)*, November 1998; 280:17 1490-1496.

Table 3 contains data on the prevalence (rate per 1,000) of diabetes for different demographic groups. The data in Table 3 is derived from the U.S. Vital and Health Statistics reference.

TABLE 3

|  | Under 30 | 30-44 | 45-54 | 55-64 | Over 64 |
|---|---|---|---|---|---|
| Female | 13.4 | 13.4 | 56.2 | 56.2 | 106.9 |
| Male | 10.0 | 10.0 | 53.1 | 53.1 | 106.5 |

With diabetes, poor or no control of the condition results in approximately 12 absentee days per diabetic per year. The absentee values are derived from End of Week 15, placebo, and absenteeism data in Table 3 of the Testa reference. The cited figure is 24 days per 500 workdays; and this value is halved to get 12 days per diabetic per year (since an average employee works approximately 250 workdays per year).

Similarly, diabetes causes an average productivity loss of 11.25 days per diabetic per year. The absentee values are derived from "end of week 15, placebo, and total days cutting down" data in Table 3 of the Testa reference. The cited figure is 45 days per 1,000 person days. To get the days per diabetic per work year, this value is divided by four. This result, corresponding to lost total days, is converted to lost workdays by multiplying by 5/7 to get 8.04 days. Finally, it is recognized that a low productivity day is not a 100% reduction, therefore this figure is depreciated by 50% to arrive at 4.02.

With good control, the absentee days total for diabetes is reduced to 2.5 days (5 per 500 workdays, divided by 2) and lost productivity is reduced to 1.52 days (28 per 1,000 days, divided by 4=4.25*5/7=3.04*0.5). Again, these values are derived from Table 3 of the Testa reference. The control values are contained in the Glipizide GITS column, and the poor control values are contained in the placebo column.

The multiplier for diabetes is the average difference in accredited plan and non-accredited plan means for the HbA1c and lipid control measures. Note that the sign on the lipid control measure must be changed as it is calculated as poor control in HEDIS.

For additional information on data related to diabetes, please refer to the following references:

1) Vijan S, Hofer T P, Hayward R A. "Cost-Utility Analysis of Screening Intervals for Diabetic Retinopathy in Patients With Type 2 Diabetes Mellitus," *JAMA* Feb. 16, 2000; 283: 889-896.

2) Burton W N, Connerty C M. "Evaluation of a Worksite-Based Patient Education Intervention Targeted at Employees With Diabetes Mellitus," *Journal of Occupational & Environmental Medicine* August 1998; 40:8 702-706.

3) Henriksson F, Jonsson B. Diabetes: "The Cost of Illness in Sweden," *Journal of Internal Medicine* 1998; 244: 461-468.

Chicken Pox

The following references are particularly relevant to chicken pox data used in the present invention and are hereby incorporated by reference:

1) *US Census Bureau Statistical Abstract of the United States*: 2000 Tables 13, 55, 68.

2) Yawn B P, Yawn R A, Lydick E. "Community Impact of Childhood Varicella Infections," *Journal of Pediatrics* May 1997; 130:5 759-765.

3) Yawn B P, Yawn R A, Lydick E. "The Relative Community Burden of Otitis Media and Varicella," *Clinical Therapeutics* November 1996; 18:5 877-886.

Table 4 contains data on the prevalence (rate per 1,000) of chicken pox for different demographic groups.

TABLE 4

|  | Under 30 | 30-44 | 45-54 | 55-64 | Over 64 |
|---|---|---|---|---|---|
| Female | 74.3 | 75.3 | 39.1 | 8.7 | 1.5 |
| Male | 42.9 | 67.4 | 39.8 | 10.1 | 1.4 |

The prevalence figures in Table 4 are based on data for households with children from the 1996 & 1997 Yawn references having a prevalence of 120.7, per 1000 households (550 households with 1+ case/4,557 total households). This rate is then adjusted to account for all households (regardless of child status).

First, the prevalence of households with children specific to employee age/gender cohort is calculated. These rates are calculated by using the rates of households with children for a married couple, male householder, and female householder (Table 68 from the *U.S. Census Statistical Abstract*), along with the marital status of the population by sex and age (Table 55 from the *U.S. Census Statistical Abstract*).

For example, the number of male employees under 30 with children equals:

% married males<30* % married couples with children under age 18

+% single males<30* % male householders with children under age 18

This rate is then combined with 120.7 prevalence rate from Yawn and depreciated by 77.7% to adjust from children under age 18 to children under age 14 to derive the above table.

The average absenteeism from chicken pox is approximately 1.68 days of caretaker absentee days per case of chicken pox. The figure of 1.68 days is the average number of caretaker absentee days per case of chicken pox (total workdays missed/total households with 1+ case) or 922.3/4557. These values are from the 1996 and 1997 Yawn references.

However, with, chicken pox, it is assumed that the parents suffer from no productivity, so no productivity effects are included at this point in time.

With chicken pox, good control generally includes full immunization and no infections. Accordingly, the chicken pox multiplier used in the present invention is the difference in the HEDIS Varicella immunization rates between accredited and non-accredited plans.

For additional information on data related to chickenpox, please refer to the following references:
1) Law B et al. "Cost of Chickenpox in Canada: Part I. Cost of Uncomplicated Cases," *Pediatrics* July 1999; 104:1 1-6.
2) Law B et al. "Cost of Chickenpox in Canada: Part II. Cost of Complicated Cases and Total Economic Impact," *Pediatrics* July 1999; 104:1 7-15.
3) Cordell R L, MacDonald J K, Solomon S L, Jackson L A, Boase J. "Illness and Absence Due to Illness Among Children Attending Child Care Facilities in Seattle-King County, Washington," *Pediatrics* November 1997; 100:5 850-856.

Heart Disease

The following references are particularly relevant to the heart disease data used in the present invention and are hereby incorporated by reference:
1) U.S. Census Bureau, *Statistical Abstract of the United States:* 2000 Tables 2, 3, 2001; 7:1 27-34.
2) Harlan W R, Parsons P E, Thomas J W, et al.: "Health care utilization and costs of adult cardiovascular conditions, United States, 1980." *National Medical Care Utilization and Expenditure Survey. Series C, Analytical Report No. 7.* DHHS Pub. No. 89-20407. National Center for Health Statistics, Public Health Service. Washington. U.S. Government Printing Office, 1989.

Table 5 presents the prevalence (rate per 1,000) of heart disease in various demographic groups. The data in Table 5 is from Table C of the Harlan reference and is the sum of values associated from Coronary Disease (CD) with hypertension and CD alone. CD with complications data is excluded as its definition allows inclusion of hypertension with co-morbidities.

TABLE 5

|  | Under 30 | 30-44 | 45-54 | 55-64 | Over 64 |
| --- | --- | --- | --- | --- | --- |
| Female | 10.4 | 10.4 | 52.5 | 52.5 | 203.2 |
| Male | 7.4 | 7.4 | 85.8 | 85.8 | 299.7 |

On average, heart disease with poor control causes 14.69 missed workdays per affected employee. This value is based on a weighted average of CD with hypertension and CD alone from Table G of the Harlan reference.

Similarly, Table G of the Harlan reference may be used to predict lost productivity days from heart disease when the employee's condition is poorly controlled, based on "mean restricted-activity days" values. The weighted average of CD with hypertension and CD alone is calculated, and then adjusted for workdays by multiplying by $5/7$. The results are further adjusted by multiplying by a factor of 0.5. This represents the actual reduction in productivity. While this figure of 0.5 is arbitrary, it is consistently used in the productivity research literature. Accordingly, $(((46.1*0.38)+(45.7*0.62))*(5/7))*(0.5)=22.9$ lost days With good care, the effects of heart disease may be drastically reduced. To determine the differences between good and poor control of heart disease, the "All Persons" Condition category from the Harlan reference is used as a base for good control. However, it may be assumed that good control is not a return to "All persons" levels, but rather a 50% improvement. Therefore, with good care, Absentee days: $4.9+((14.7-4.9)/2)=9.8$ Productivity days: $((15.6)*(5/7)*(1/2)=5.57)$–"good control"

$5.57+((22.47-5.57)/2)=14.02$

The multiplier is then the mean of the difference between accredited and non-accredited plan average scores for the Beta-Blocker and Lipid Control HEDIS measures.

For more information regarding heart disease data, please refer to the following references.
1) Guico-Pabia C J, Murray J F, Teutsch S M, Wertheimer A I, Berger M L. "Indirect Costs of Ischemic Heart Disease to Employers," *American Journal of Managed Care*, January 2001; 7:1 27-34.
2) Wasserman J, Whitmer R W, Bazzarre T L, Kennedy S T, Merrick N, Goetzel R Z, Dunn R L, Ozminkowski R J, HERO Research Committee. "Gender Specific Effects of Modifiable Health Risk Factors on Coronary Heart Disease and Related Expenditures," *Journal of Occupational and Environmental Medicine* 2000; 42: 1060-1069.
3) Phillips K A, Schlipak M G, Coxson P, Heidenreich P A, Hunink M G M, Goldman P A, Williams L W, Weinstein M C, Goldman L. "Health and Economic Benefits of Increased B-Blocker Use Following Myocardial Infarction," *JAMA* December 2000; 284:21 2748-2754.
4) Howard P A, Ellerbeck E F. Optimizing Beta-Blocker Use After Myocardial Infarction," *American Family Physician* 2000; 62: 1853-1860, 1865-1866.
5) Goff D C, Pandey D K, Chan F A, Ortiz C, Nichaman M Z. "Congestive Heart Failure in the United States: Is There More Than Meets the I(CD Code)? The Corpus Christi Heart Project," *Archives of Internal Medicine* 2000; 160: 197-202.
6) Zethraeus N, Molin T, Henriksson P, Jonsson B. Costs of Coronary Heart Disease and Stroke: The Case of Sweden, *Archives of Internal Medicine* 1999; 246: 151-159.
7) Sagmeister M, Gessner U, Oggier W, et al. An Economic Analysis of Ischemic Heart Disease in Switzerland. *European Heart Journal* 1997; 18: 1102-1109.
8) Pestana J A, Steyn K, Leiman A, Hartzenberg G M. The Direct and Indirect Costs of Cardiovascular Disease in South Africa in 1991. *SAMJ* 1996; 86:6 679-684.
9) Funk M, Krumholz H M. Epidemiologic and Economic Impact of Advanced Health Failure. *Journal of Cardiovascular Nursing* 1996; 10:2 1-10.

Hypertension

The following references are particularly relevant to the hypertension data used in the present invention and are hereby incorporated by reference:
1) US Census Bureau, *Statistical Abstract of the United States:* 2000 Tables 2, 3.
2) Harlan W R, Parsons P E, Thomas J W, et al. Health care utilization and costs of adult cardiovascular conditions, United States, 1980. *National Medical Care Utilization and Expenditure Survey*. Series C, Analytical Report No. 7. DHHS Pub. No. 89-20407. National Center for Health Statistics, Public Health Service. Washington. U.S. Government Printing Office, 1989.
3) Bertera R L. The Effects of Behavioral Risks on Absenteeism and Health-Care Costs in the Workplace. *Journal of Occupational & Environmental Medicine* November 1991; 33:11 1119-1124.
4) Yen L T, Edington D W, Witting P. Prediction of Prospective Medical Claims and Absenteeism Costs for 1284

Hourly Workers from a Manufacturing Company. *Journal of Occupational Medicine* April 1992: 34:4 428-435.

Table 6 presents the prevalence (rate per 1,000) of hypertension in various demographic groups. The data in Table 6 is from Table C of the Harlan reference.

TABLE 6

|        | Under 30 | 30-44 | 45-54 | 55-64 | Over 64 |
|--------|----------|-------|-------|-------|---------|
| Female | 22.6     | 22.6  | 181.8 | 181.8 | 235.5   |
| Male   | 30.6     | 30.6  | 118.7 | 118.7 | 145.5   |

From Table G of the Harlan reference, hypertension causes 6.5 absentee days per affected person per year (mean work-loss days). Similarly, data from Table G of the Harlan reference may be used to determine lost productivity days per affected employees. The productivity days are based on the "mean restricted-activity days." These are adjusted for workdays by multiplying by $5/7$. They are further adjusted by multiplying by a factor of $1/2$. This represents the actual reduction in productivity. While this figure of $1/2$ is arbitrary, it is consistently used in the productivity research literature. Thus, there is lost productivity of $(20.1)*(5/7)*(1/2)=7.18$ days per affected employees The differences in lost employee days attributable to the difference in good and poor control of hypertension may also be inferred from the Harlan reference, Table G. Specifically, the "All Persons" Condition category is used to represent good control. Therefore, with good care, Absentee days: 4.9 (mean work-loss days)
Productivity days: $(15.6)*(5/7)*(1/2)=5.57$ With hypertension, the multiplier is the difference between accredited and non-accredited plan average scores for the High Blood Pressure Control HEDIS measure.

Smoking

At the present, the measures related to smoking are based on advising smokers to quit. The marginal impact of advice on quit rates is very low −2.8%.

The following references are particularly relevant to the smoking data used in the present invention and are hereby incorporated by reference:
1) Smith S S, Fiore M C. The Epidemiology of Tobacco Use, Dependence, and Cessation in the United States, *Primary Care, Clinics in Office Practice* September 1999; 26:3 433-461.
2) Warner K E, Smith R J, Smith D G, Fries B E. Health and Economic Implications of a Work-Site Smoking-Cessation Program: A Simulation Analysis, *Journal of Occupational and Environmental Medicine* October 1996; 38:10 981-992.
3) Jorenby D E, Fiore M C. The Agency for Health Care Policy Research *Smoking Cessation Clinical Practice Guideline: Basics and Beyond, Primary Care, Clinics in Office Practice* September 1999; 26:3 513-528.

The following Table 7 presents the prevalence (rate per 1,000) of smoking in various demographic groups:

TABLE 6

|        | Under 30 | 30-44 | 45-54 | 55-64 | Over 64 |
|--------|----------|-------|-------|-------|---------|
| Female | 218.0    | 268.0 | 240.0 | 240.0 | 115.0   |
| Male   | 278.0    | 305.0 | 271.0 | 271.0 | 143.0   |

The figures used are from the Smith reference, which quotes directly from the CDC.

The number of additional absentee days for smokers ranges from 2 to 5.5 days per year. The most conservative and most often cited figure is 2 additional days of absenteeism per year. This figure is cited in the Warner reference. Specifically, the male rate is 3.9 and female is 2.1 additional days, compared to non-smokers. However, one needs to consider the rate compared to those who recently quit.

Smoking causes a 1% reduction in workdays per year (assuming 50 work weeks with 5 workdays each). The productivity effect of smoking is quantified primarily through the time taken for smoking breaks in excess of normal breaks. This estimate also varies substantially across studies. Warner cites a 1% productivity effect, which is the equivalent of one additional 5-minute smoking break per 8-hour shift.

The incremental difference in quit rates when advised to quit by a physician (i.e., with good control) versus no advice is 2.3%. The no control absentee/productivity days were depreciated by this amount to calculate the good control days. The incremental difference in quit rates when advised to quit smoking from a physician is from the Jorenby reference (page 516).

With the condition of smoking, the multiplier is the difference between the accredited and non-accredited CAHPS Advising Smokers to Quit Rates.

For additional information on the effects of smoking, please refer to the following references:
1) Robbins A S, Chao S Y, Coil G A, Fonesca V P. Costs of Smoking Among Active Duty US Air Force Personnel— United States, 1997, *MMWR* (*Morbidity and Mortality Weekly Report*) May 26, 2000; 49:20 441-445.
2) ASH. Smoking in the Workplace Costs Employers Money, ASH-Action on Smoking and Health. See at http://www-.smokefreekids.com/worknews.htm. Accessed Dec. 4, 2000.
3) Weis W L. The Smoke-Free Workplace: Cost and Health Consequences, W F Forbes, R C Frecker, D Nostbakken, eds. *Proceedings of the Fifth World Conference on Smoking and Health*, Canadian Council on Smoking and Health 1983; 2: 289-297.

Thus, the present invention incorporates current research available with respect to prevalence rates, efficacy of measurement and control efforts, and other aspects. It should be appreciated that the present invention may adapt to reflect new research, changes in treatment and coverage, and changes in the sophistication of health services measurement.

Returning to FIG. 2A, the number of employees in each demographic group defined in step 210 is multiplied by the prevalence rates defined in step 220 to determine the predicted actual prevalence of the medical conditions, step 230. For example, if an organization has 100 female employees between the ages of 20-25, and the prevalence of smoking in that demographic group is 20%, then the health plan valuation method 100 predicts that 20 (100*0.20) of the organization's female employees in this age group smoke.

In this way, the present invention combines employee data, such as the information collected in FIG. 6, and medical condition data, such as the information displayed in FIG. 7 and generally described above. Specifically, the present invention forms an estimate of the number of the employees at the particular business affected by the various medical conditions. For instance, the second-to-left column in FIG. 9 contains an estimate of the "Effected Employees" at the business affected by each of the medical conditions. This estimate is formed by multiplying the employee population statistics for each demographic group by the prevalence rates of the medical condition for the demographic group and, then, summing this product for all demographic groups.

Returning to FIG. 1, the next step in method 100 is to calculate relative changes in absenteeism and low productivity days caused by differences in health plans, step 300. A particular health care plan or class of health care plans may confer upon employers the benefits from improved monitoring and control of plan member health status, and the economic model of the present invention allows employers to quantify the impact on their firm from employee coverage by this health plan.

As depicted in FIG. 3, the first task in calculating relative changes in absenteeism and low productivity days caused be differences in health plans in step 300 is to calculate the reduction in absentee days and low productivity days when a health condition is well controlled, step 310. As noted above in the descriptions of each of the medical conditions, the reduction in absentee days and low productivity days from the control of each of the health conditions may be studied and determined empirically. The difference in absentee days and low productivity days is determined in absolute terms, comparing little or no control of a condition versus a high level of control of the condition.

For example, FIG. 9 depicts a savings spreadsheet 900 showing exemplary per capita savings of absentee days and low productivity days for each of the conditions. As can be seen in the saving spreadsheet 900, the per capita savings represents the expected difference in absentee days and low productivity days which caused a switch from poor control to good control. As further depicted in FIG. 9, the present invention estimates, using historical data such as the above-described studies, the number of worker days lost to absenteeism and low productivity per affected employee. For each medical condition or disease state, the model results are based on the improvement in absenteeism and productivity as a result of "good control" compared to "poor control." These estimates are from research studies specifically aimed at identifying the beneficial effects of improved control of disease states. The net difference of worker days, as seen as "savings" in the right-most column of FIG. 9, represents the relative benefit per affected employee of properly controlling the medical condition.

Continuing with FIG. 3, the next task in calculating relative changes in absenteeism and low productivity days caused by differences in health plans in step 300 is to form a multiplier representing the amount of change in treatment and control of each of the conditions, step 320. This multiplier quantifies relative differences in health care provided by two health care plans or classes of health care plans. In other words, the multiplier represents the relative ability of a health care plan to provide good control of each of the conditions.

The present invention may use statistical comparisons of two health care plans or classes of health care plans to determine the difference in the treatment/control rates of the various medical conditions. For instance, FIG. 8 illustrates a health care spreadsheet 800 containing HEDIS coefficients representing exemplary diabetes treatment levels in accredited plans compared to non-accredited plans. The HEDIS rates reflect the percentage of population covered for specific control measurement, allowing straightforward comparisons of the different levels of health care. In this way, the present invention allows the businesses to view the different treatment levels in two plans or classes of plans. As indicated above in the descriptions of the medical conditions, the HEDIS scores help in determining the difference in care provided by the health plans. Also, as described above, the HEDIS scores may be used to create a multiplier representing the relative differences in the ability of a health plan to control a medical condition.

The following Table 8 summarizes individual HEDIS measures that are may be used in the present invention. In table 8, the average performance of accredited plans is compared with the average performance of nonaccredited plans. The difference between the two groups (called the HEDIS Multiplier) will be used to calculate the benefit to employers from contracting with accredited plans.

TABLE 8

| Category | | Accred Top 10% | Non Accred Mean | Diff. |
|---|---|---|---|---|
| Asthma | Asthma Medication Use - Ages 10-17 | 69.3% | 59.2% | 10.1% |
| | Asthma Medication Use - Ages 18-56 | 71.5% | 63.3% | 8.2% |
| | Asthma Medication Use - Ages 5-9 | 73.0% | 59.8% | 13.2% |
| | Asthma Medication Use - Combined Rate | 70.6% | 60.8% | 9.8% |
| Chicken Pox | VZV Immunization Rate | 82.7% | 67.9% | 14.8% |
| Depression | Antidepressant - Acute Phase Rate | 70.0% | 57.8% | 12.2% |
| | Antidepressant - Continuation Rate | 53.3% | 42.5% | 10.8% |
| | Antidepressant - Contact Rate | 38.2% | 19.0% | 19.2% |
| | Mental Illness Follow-up 30 Day Rate | 86.4% | 66.9% | 19.5% |
| Diabetes | HbA1c Testing Rate | 89.1% | 75.2% | 13.9% |
| | HbA1c 'Poor Control' Rate | 31.4% | 47.4% | −16.0% |
| | Eye Exam Rate | 66.2% | 42.2% | 24.0% |
| | Lipid Profile Rate | 86.6% | 72.9% | 13.7% |
| | Lipid Control Rate | 57.7% | 40.1% | 17.6% |
| | Nephropathy Monitor Rate | 60.8% | 38.4% | 22.4% |
| Heart Disease/ Hypertension | Beta Blocker Treatment Rate | 97.9% | 84.8% | 13.1% |
| | Controlling Blood Pressure Rate | 62.8% | 48.7% | 14.1% |
| | Cholesterol Screening Rate | 85.1% | 72.2% | 12.9% |
| | Cholesterol Control Rate | 68.9% | 45.7% | 23.2% |
| Smoking | Advising Smokers to Quit Rate 1999/2000 | 73.9% | 65.9% | 8.0% |

The number of affected employees (from step 200) may be multiplied by the per capita savings (from step 310) and by the multiplier (from step 320) to determine total changes in absenteeism and low productivity days, step 330. The improved control of the medical conditions causes a reduction in absentee days and in low productivity days, the calculation of days gained by the organization. The basic calculation of the annual gain measured in days (fewer absent days, and fewer low productivity days) is shown in the following equation:

Number of employees effected by condition × Days regained per employee each year from improved control of that condition × multiplier for that condition, reflecting the benefit of a higher percentage of employees subject to improved control = Total annual reduction in absent days, and low productivity days, for the specified medical condition Turning now to FIG. 10, an exemplary total savings spreadsheet 1000 uses the savings results from FIG. 9 to estimate the relative change in lost worker days caused by the different health care plans or different classes of health care plans. The present invention finds the product of (1) the savings per employee from good control of a medical condition from FIG. 9, (2) the number of effected employees at the particular business from FIG. 9, and (3) the above-described multiplier. The multiplier represents the relative difference in the ability of the two plans or classes of plans to control the various medical conditions. This estimate of relative lost or gained employee days is customized to the particular business, because the business's employee demographics are used in the formation of the estimate. For example, if an organization has 100 employees suffering from asthma and the proper control of asthma reduces absenteeism and lost productivity by 10 days per affected worker, then a change to a health plan having a multiplier of 0.5 (i.e., the new health plan works controls an additional half of the number of effected employees) results in a reduction of 100×10×0.5 or 500 workdays.

As depicted in FIG. 1, the health plan valuation method 100 may optionally include the calculation of a value to the organization of the change in absenteeism and low productivity days, step 400. As depicted in FIG. 4A, to estimate a monetary value for the change in the value of the change in absenteeism and low productivity days, the health plan valuation method 100 obtains the calculated change in absenteeism and low productivity days from step 300, step 410; calculates the value to the organization for each lost day, step 420; and multiplies the total number of lost days by the value for the lost day, step 430.

In step 410, the calculated change in absenteeism and low productivity days from step 300 is used to determine the loss of labor resources that is attributable to relative differences between two health care plans or categories of health care plans. As described above, the age/gender information is used to estimate how many fewer absentee days and how many fewer low productivity days a workforce would experience when covered by one class of plans as compared to coverage by another class of plans.

To determine the dollar impact of this benefit, the present invention may use information to determine a value for a workday, such as the average daily wage for the workforce and the average daily revenue per employee. The expected value for a workday is determined in step 420 using different methods. For instance, as described below, an organization may provide a value for an employee day or the organization may use a default value. Alternatively, the value for an employee day may be dynamically created.

A process for determining the value of an employee day is depicted in FIG. 4B. First, the organization may provide various accounting information, step 422. The accounting information includes the average daily wage for the employees, benefits and fringe overhead rates for the employees, and annual revenue per employee. Other accounting information that may be used in the present invention includes the organization's average revenue per employee (based on the organization's revenues, the number of employees, and the average number of days worked by each employee); average employee replacement cost; losses from unreplaced employees; and other parameters.

The organization may provide accounting information in step 422 concurrently with providing demographic information in step 212. For example, the data form 600 in FIG. 6 depicts a questionnaire through which an organization may concurrently provide accounting information with the demographic information. For instance, the depicted data form 600 asks for an estimate of the average daily wage and, if known, the overhead percentage for benefits. Using this and similar information, the present invention permits more specific estimation of productivity and absenteeism effects as well as translating those effects into estimates of dollars saved specific to the population of the employer.

Returning to FIG. 4B, the next task, step 424, is to form an estimate of the value to the organization of per employee per day, using the information provided step 422. A first step is to calculate the average replacement cost of hiring a temporary worker when a permanent employee is absent. This daily replacement cost is assumed to be equal to the daily wage of the permanent employee, plus a component to reflect hiring, training, and increased supervisory costs. The default value for this component is 10% of daily wage, and the value of this component can be changed by the user.

A next step is to apply the daily replacement cost to the number of days saved from improved care of employee chronic conditions. That is, the present invention shows that absenteeism for specific medical conditions will be reduced from better care by accredited health plans. The total dollar impact on replacement costs will be the average daily replacement cost multiplied by the total reduction in absenteeism and low productivity days.

The present invention also includes a component to reflect the loss in revenue that may result when workers are not replaced. The present invention may calculate the average daily revenue per employee, based on user inputs for the firm's annual revenue and for the company's workforce. The present invention may also allow the user to specify 1) when a worker is absent, how often the worker is not replaced, and 2) if the absent worker is not replaced, what percent of the average daily revenue per employee is lost to the firm.

The total dollar impact is then the reduction in replacement costs plus the revenue that was saved from reduced absenteeism.

For illustrative purposes, the present invention may also calculate the reduction in "sick day dollars" because of lower absenteeism. Typically, permanent employees are paid for time off because of illness, and a reduction in sick time will not in itself be a financial gain for the firm. However, the present invention calculates this value in order to show the reduction in dollars paid to employees for time off because of illness.

The value of a workday may be the productivity per employee, which may be calculated as the business's annual revenue divided by the number of employees and the annual number of workdays per employee. In this way, the present invention forms an estimate of the employee's daily contribution to the business's revenues. For instance, if a business has revenue of $2 million and 100 employees who work an average of 200 days per year, the estimate of daily productivity per employee is $100. Alternatively, the economic value of each workday may be the replacement cost per employee. Using this measure of the value of a workday, an organization may avoid submitting sensitive revenue information.

The present invention may use an average daily wage for employees, if the organization does not wish to provide this type of information in step 422. The present invention may supply a default value of $130 per day per worker, not including fringes and benefits. This value is taken from the U.S. Bureau of Labor Statistics and represents the average wage for all U.S. civilian workers for the fourth quarter of 2001. If known, the organization may replace the default value by providing the average for its employees. The organization can also choose the average wage for industry groups such as manufacturing, retail, finance, and general.

The organization may also replace the default values for other parameters, including:

Average overhead percent for fringes and benefits;

Average overhead percent for fringes and benefits provided to replacement workers; and Percent of average daily wage to reflect costs for hiring, training, and supervisory costs.

As described above, the present invention may also use average overhead percent for fringes and other benefits. The default value is 25% of average wage, and this value represents the health and retirement benefits, and employee taxes (FICA, FUTA, etc.), that the firm pays in addition to the actual daily wage. This default value represents an average for all civilian workers in the fourth quarter of 2001, according to the U.S. Bureau of Labor Statistics.

The present invention may also look to average overhead percent for fringes and benefits provided to replacement workers. An organization may also indicate the additional fringes and benefits, if any, paid to temporary workers that are brought in to replace absent permanent workers. Some organizations provide some level of health benefits, but others do not. The default value is 10% of average wage.

The present invention may also evaluate the percent of average daily wage to reflect costs for hiring, training, and supervisory costs. The present invention includes a component to reflect the costs to the firm of replacement workers beyond wages and benefits—recruiting, training, increased supervisory costs, and so on. (These are sometimes referred to as frictional costs.) The default value is 10% of the average daily wage.

The present invention further looks to how often absent workers are replaced with temporary workers. An organization may change the default value that indicates, on average, how often replacement workers are brought in when a permanent employee is absent. Many service and manufacturing firms rely extensively on temporary workers to fill in for absent employees, and some firms rely on increased output from remaining workers or defer the work until the employee returns. Sometimes replacement workers cannot be found in time. The default value in the model is 80%—that is, for 8 times out of 10 that a permanent employee is absent, a temporary replacement worker is brought in.

The present invention may further look to the percent loss of average daily wage per employee, if not replaced. The present invention recognizes that when an absent worker is not replaced there may be a revenue loss to the firm. Perhaps output cannot be made up by co-workers, or sales opportunities are missed. The default value in the model is 50% of the average daily revenue per employee. This means that when an employee is not replaced with a temporary worker, the organization suffers a revenue loss equal to half of the average daily revenue per employee. This revenue loss will only apply when permanent employees are not replaced with a temporary worker. The default values in the model imply that 20% of the time absent employees are not replaced, there is a revenue loss of half of the average daily revenue per employee. Obviously, an organization may provide different values in step 422.

The next step in the present invention is to calculate dollar gains from a health care plan or class of health care plans, step 430. Specifically, the present invention translates the number of saved worker days into a dollar impact on the firm. This revenue impact is an estimated revenue gain from fewer absentee days and fewer low productivity days, as contained in FIG. 10, multiplied by employee costs provided in FIG. 6. In step 430, the lost labor (as generally embodied in total lost absenteeism and low productivity days) is multiplied by one or more measures of the daily value of each of the organization's employees from step 420. In an alternative implementation of step 430, the economic daily values of different classes or demographic groups of employees may be determined by multiplying a different daily monetary value for each of the different classes or demographic groups of employees by the number of lost absenteeism and low productivity days for those particular classes or demographic groups.

For example, for a business having an average daily productivity per employee of $100, as derived above, better health care causing a thousand fewer absentee days and one thousand fewer days lost to low productivity would have an economic benefit of 100*(1000+1000), or $200,000. The present invention may also present to the business a measure of the fewer dollars paid to absent workers (sick day dollars) as a result of the better control of the medical conditions.

While the present invention has been presented in terms of analyzing economic benefits from reduced absenteeism and increased productivity, the present invention may be expanded to evaluate benefits from improvements in the quality of service. Specifically, the present invention may quantify the impact on productivity and absenteeism caused by increased administrative burden that employers and employees experience from health plans. Specific issues include claims payment problems, delays in authorizations for service, issues around slow enrollment of new employees, and appointment availability. Similarly, the present invention may quantify productivity and absenteeism effects related to the direct cost of care.

Figure 5A:
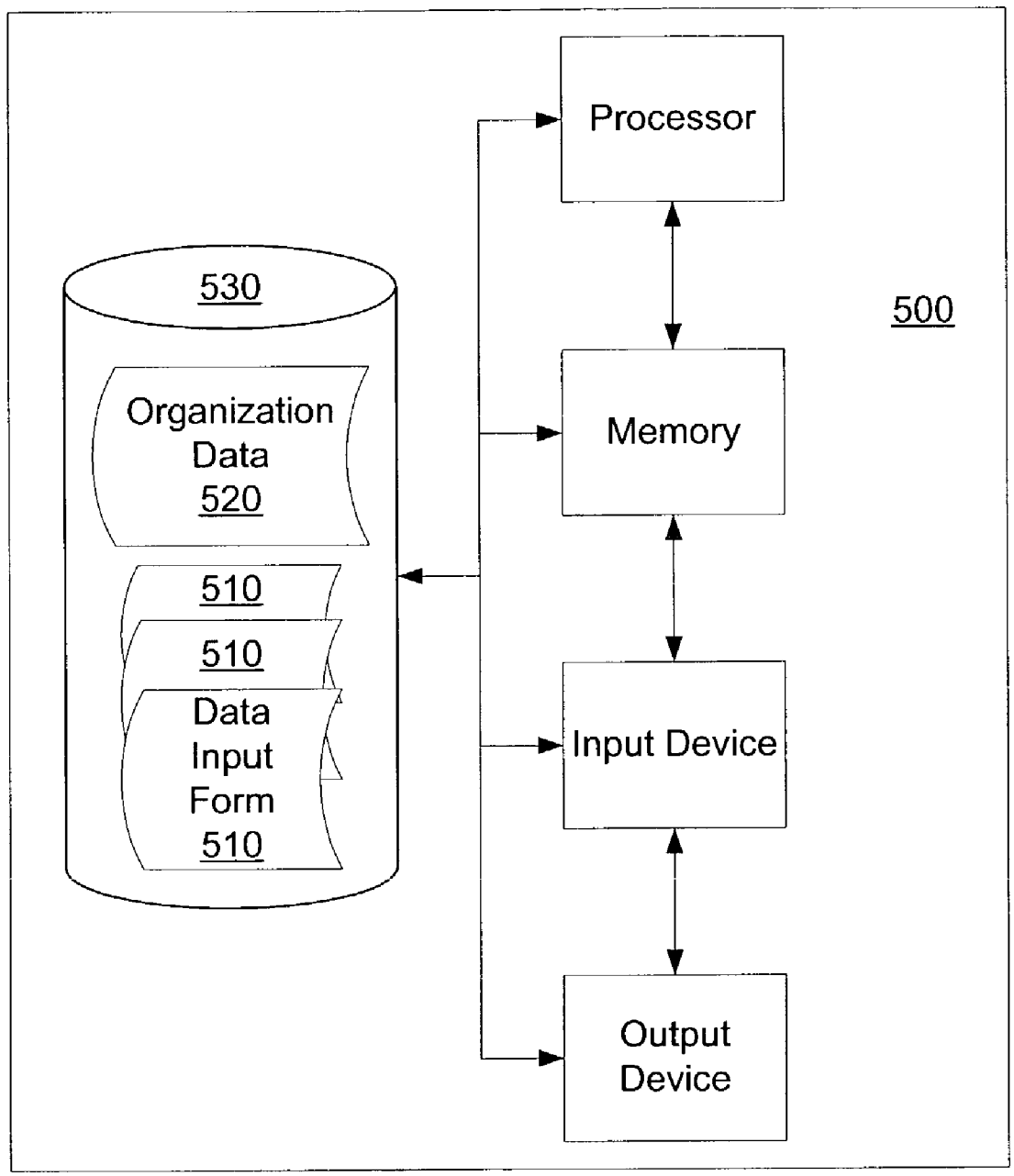
FIGS. 5A-B are schematic illustrations of systems for measuring the economic value of differences in health insurance in accordance with embodiments of the present inventions.
Figure 5B:
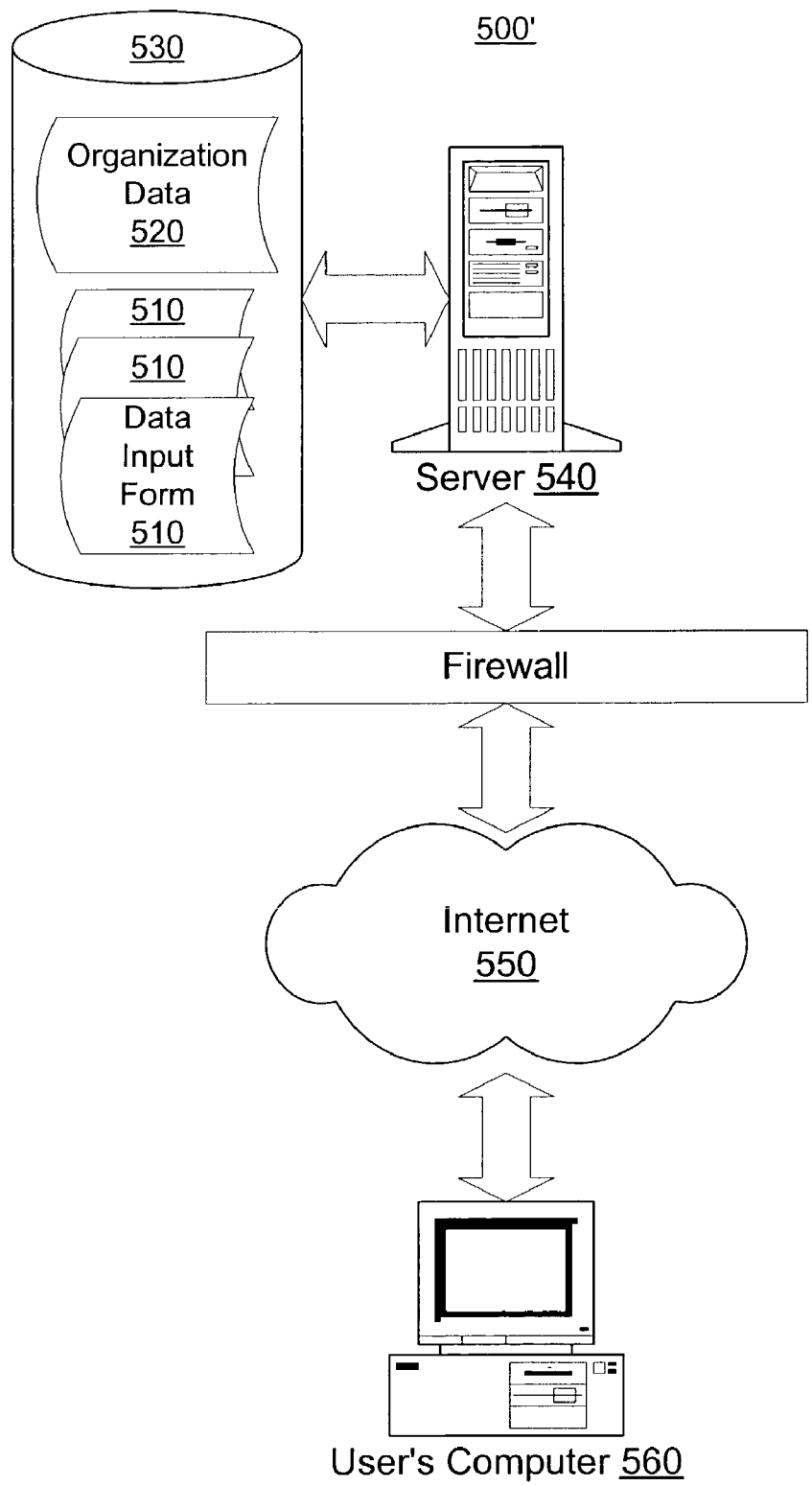
Figure 11:
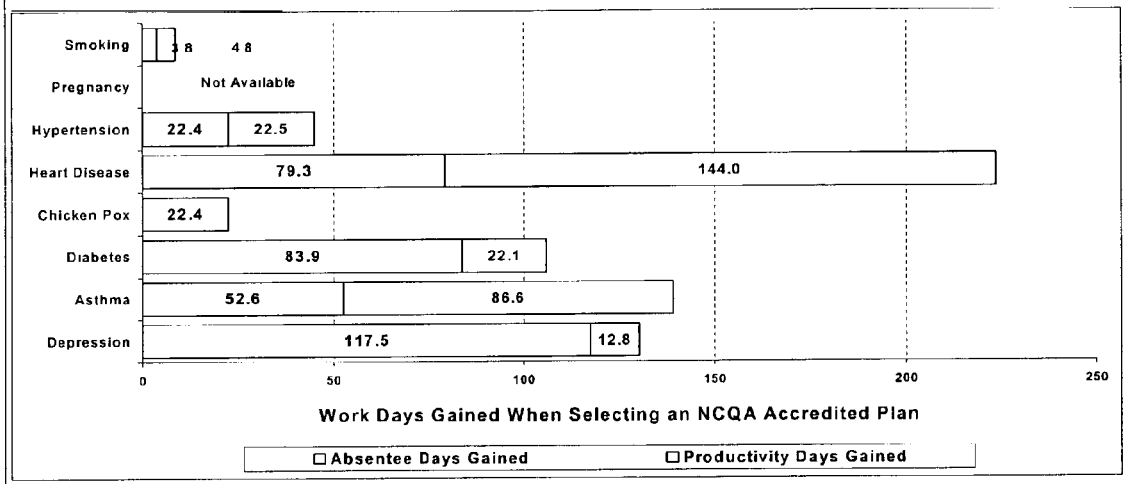

As depicted in FIGS. 6-11, the health care plan valuation method 100 may be implemented as a series of linked forms 510 or as an interactive HTML web-based page. Embodiments of a system 500 for providing these forms 510 to an organization are depicted in FIGS. 5A and 5B. The system 500 depicted in FIG. 5A schematically depicts a device for locally obtaining and displaying the forms 510. The forms 510 are stored on a storage device 530. Additionally, any information 520 collected from the organization may also be stored on the data storage device 530. The storage device 530 is a well known technology and generally includes magnetic storage media, optical storage media, dynamic memory, etc. The organization may interact directly with the system 500 using numerous known means. For instance, a user may input data using standard input devices such as a keyboard or mouse. Likewise, the user may receive output data through a video monitor or other type of known output device. It should be appreciated that the user may interact with the system 500 using other types of known input/output (I/O) devices. In operation, the forms 510 on the storage device 530 are presented to the organization on some type of output device. The organization may then provide data 520, as described above in steps 212 and 422 via the input device.

As illustrated in FIG. 5B, the system 500 allows an organization to remotely access forms 510 via a network 550. Specifically, a server 540 allows a user to remotely access forms 510 using known networking configurations. The server 540 directly connects to the data storage device 530, or alternatively, the data storage device 530 may be remotely connected to the server 540 via the network 550. The network 550 may be selected from numerous known communication technologies, such as intranets, internets, the Internet, LANs, and WANs.

The present invention may also present a graphical representation of the better control of the various medical conditions achieved by a better health care plan or class of plans. For example, FIG. 11 contains a graphical depiction of days saved by disease state, split between improvements in absenteeism and fewer low productivity days.

CONCLUSION

The foregoing description of the preferred embodiments of the invention has been presented for the purposes of illustration and description. It is not intended to be exhaustive or to limit the invention to the precise form disclosed. Many modifications and variations are possible in light of the above teaching. For instance, the present invention is described in the context of lost workdays and a value is formed for each lost workday; however, an analogous procedure may be implemented for other time periods such as lost hours or lost weeks. It is intended that the scope of the invention be limited not by this detailed description, but rather by the claims appended hereto. Many embodiments of the invention can be made without departing from the spirit and scope of the invention.

The invention claimed is:

1. Software for use by an organization having a number of members of differing ages, said software stored on a computer readable storage device containing instructions for causing a microprocessor to determine the amount of money an organization could expect to pay by selecting a particular health plan from a set of health plans ($H_0$-$H_j$), and a total annual reduction in sick days and low productivity days for a medical condition, said instructions causing the microprocessor to perform the steps of:

a providing data relating to the members of the organization, the data including a list of ailments ($A_0$-$A_i$), that may cause the members of the organization to experience:

(i) a sick day in which the member is absent or is unable to work on a given day, or (ii) a partial impairment day in which the member's productivity on a given day is lowered or partially impaired, b for a first health plan ($H_0$) and a first ailment ($A_0$), providing information which includes a list of age ranges ($R_0$-$R_k$), the number (N) of members within a first age range ($R_0$) that may be expected to be affected by a specific ailment in the list of ailments, the number of sick days (Sc) a member is expected to experience in a set time period when the first ailment (A0) is controlled by a first health plan (H0), the number of sick days (Sn) a member is expected to experience in a specific time period when the first ailment (A0) is not controlled by the health plan (H0), the number of partial impairment days (Pc) a member is expected to experience in a set time period when the first ailment (A0) is controlled by the health plan (H0), the number of partial impairment days (Pn) a member is expected to experience in a set time period when the first ailment (A0) is not controlled by the health plan (H0), a control percentage ($C_0$), for the first health plan ($H_0$), age range ($R_0$), and first ailment ($A_0$), and a control percentage ($C_0$) for a second health plan ($H_1$) for the first age range ($R_0$) and the first ailment ($A_0$), c for the first health plan ($H_0$) and the first ailment ($A_0$), calculating the total number of sick and partial impairment days by:

(i) determining the number of sick days a member in the first age range ($R_0$) is expected to experience if the organization selects the particular health plan ($H_0$), (ii) determining the number of partial impairment days in the first age range ($R_0$) a member is expected to experience if the organization selects the particular health plan ($H_0$), (iii) determining the total number of sick and partial impairment days ($d_0$) in the age range ($R_0$) for ailment ($A_0$) that all members in the age range ($R_0$) are expected to experience, (iv) saving the total number of sick and partial impairment days ($d_0$), d calculating the value (V) of a member to the organization per day, e determining how severe the partial impairment of the member's ability to work is, and expressing this severity as a percentage (I), wherein a higher percentage indicates a greater impairment of the member's ability to work, f determining the difference ($f_0$) in the number of sick days and partial impairment days ($d_0$) a member in the first age range ($R_0$) is expected to experience while using the first health plan ($H_0$) as opposed to the second health plan $H_1$ by subtracting ($S_n$+I×$P_n$) from ($S_x$+I×$P_c$) and saving the difference ($f_0$), g determining a multiplier ($m_0$) by subtracting $C_0$ of $H_1$ from $C_0$ of $H_0$ and saving the result as multiplier ($m_0$), h determining a total annual reduction in sick days and low productivity days for a medical condition by multiplying N×$f_0$×$m_0$, and i determining the expected amount of money ($E_0$) the organization could expect to pay by selecting health plan ($H_0$), for age range ($R_0$) and ailment ($A_0$), by calculating the value of N×V×($d_0$) to determine the amount of money ($E_0$) the organization could expect to pay by selecting health plan ($H_0$.

2. The software of claim 1, wherein the storage device is magnetic storage media, optical storage media, or dynamic memory; and wherein a server comprises the storage device and the processor.

3. The software of claim 2, comprising the additional step under step c of determining the total number of sick and partial impairment days ($d_0$-$d_i$) for all ailments ($A_0$-$A_i$) in all the age ranges ($R_0$-$R_k$).

4. The software of claim 3, comprising the additional steps under step c of determining the total number of expected sick and partial impairment days for all health plans ($H_0$-$H_j$) for all the ailments ($A_0$-$A_i$) in all the age ranges ($R_0$-$R_k$), by generating a list of sick and partial impairment days ($d_0$-$d_i$) for each health plan, and summing the value of the items in the list determine the total number of expected sick and partial impairment days ($t_0$-$t_j$) for each health plan.

5. The software of claim 4, comprising the additional step of determining the amount of money ($E_0$-$E_j$) the organization could expect to save under each health plan ($H_0$-$H_j$) by calculating the product of N×V×($t_0$-$t_j$), and saving the value of the expected amount of money ($E_0$-$E_j$).

6. The software of claim 5, comprising the additional steps under step b of providing health information including the cost ($k_0$-$k_j$) of the health plans ($H_0$-$H_j$).

7. The software of claim 6, comprising the step of generating a list ($\$_0$-$\$_j$) of the predicted amount of money that would be saved by the organization's selection of a particular health plan, by subtracting the cost ($k_0$-$k_j$) of the health plans from the expected amount of money ($E_0$-$E_j$) and storing the list ($\$_0$-$\$_j$).

8. The software of claim 7, comprising the step of identifying the most profitable health plan for the organization to use by selecting the highest number from the list ($\$_0$-$\$_j$).

9. The software of claim 1, comprising the additional step under step c of determining the total number of sick and partial impairment days for all the age ranges ($R_0$-$R_k$).

10. The software of claim 1, comprising the additional step under step b of providing health information including the cost ($k_0$) of the health plan.

11. The software of claim 1, wherein under step c(i) the number of sick days a member in the first age range ($R_0$) is expected to experience while using the first health plan ($H_0$), is determined by calculating: $S_c$ times $C_0$ plus $S_n$ times $(1-C_0)$.

12. The software of claim 1, wherein under step c the number of partial impairment days a member is expected to experience while using the first health plan ($H_0$) is determined by calculating:

$$I(P_c \times C_0 + P_n \times (1-C_0)).$$

13. The software of claim 1, wherein under step c the number of partial impairment days a member is expected to experience while using the first health plan ($H_0$) is determined by calculating:

$$(P_c \times C_0 + P_n \times (1-C_0)).$$

14. The software of claim 1, wherein under step c(iii) the total number of sick and partial impairment days in the age range ($R_0$), is determined by summing the values of the results of steps c(i) and c(ii) and multiplying by the total number of members (N) in the age range ($R_0$).

15. The software of claim 1, comprising the additional step under step c of repeating steps c(i)-c(iv) for the first health plan ($H_0$), the first control percentage ($C_0$), the first ailment ($A_0$), and a second age range ($R_1$) to determine the total number of sick days and partial impairment days ($d_0$) for the second age range ($R_1$).

16. The software of claim 1, comprising the additional step under step c of repeating steps c(i)-c(iv) for the first health plan ($H_0$), the first control percentage ($C_0$), the first ailment ($A_0$), and all the remaining age ranges ($R_2$-$R_k$) to determine total number of sick days and partial impairment days ($d_0$) for all the age ranges ($R_0$-$R_k$).

17. The software of claim 16, comprising the additional step under step c of repeating steps c(i)-c(iv) for the first health plan ($H_0$), a second control percentage ($C_1$), and a second ailment ($A_1$), to determine the total number of sick days and partial impairment days ($d_1$) for all age ranges.

18. The software of claim 17, comprising the additional steps under step c of repeating steps c(i)-c(iv) for the remaining ailments ($A_2$-$A_i$) using the respective control percentage ($C_2$-$C_i$) to obtain a list of the number of sick and partial impairment days ($d_0$-$d_i$).

19. The software of claim 17, comprising the additional steps under step c of summing the results ($d_0$-$d_i$) and saving the sum ($t_0$).

20. The software of claim 19, comprising the step of calculating the value (V) of each member per day, calculating the first expected amount saved ($E_0$) by using the first health plan ($H_0$) by multiplying V times to, and saving the first expected amount saved ($E_0$).

21. The software of claim 20, comprising the steps of: determining a predicted amount of money ($\$_0$) that would be saved by the organization's selection of a particular health plan; providing the cost ($k_0$) of the health plan ($H_0$) in step b; subtracting the cost ($k_0$) of each health plan from the amount saved ($E_0$); and saving the predicted amount of money ($\$_0$).

22. The software of claim 1, comprising the additional step of repeating steps b and c using the information relating to a second health plan ($H_1$) instead of the first health plan ($H_0$).

23. The software of claim 22, comprising the additional steps under step b of providing health information including:

the number of sick days ($S_c$) a member is expected to experience in a set time period when the first ailment ($A_0$) is controlled by a second health plan ($H_1$), the number of sick days ($S_n$) a member is expected to experience in a set time period when the first ailment ($A_0$) is not controlled by the health plan ($H_1$), the number of partial impairment days ($P_c$) a member is expected to experience in a set time period when the first ailment ($A_0$) is controlled by the health plan ($H_1$), the number of partial impairment days ($P_n$) a member is expected to experience in a set time period when the first ailment ($A_0$) is not controlled by the health plan ($H_1$), a control percentage ($C_0$) for the health plan ($H_1$) for the first ailment ($A_0$), and the number (N) of members within a first age range ($R_0$) that may be expected to be affected by a specific ailment in the list of ailments.

24. The software of claim 23, comprising the additional step under step c of repeating steps c(i)-c(iv) for the second health plan ($H_1$), the first age range ($R_0$), and the first ailment ($A_0$), to determine the total number of sick days and partial impairment days ($d_1$) for the first age range ($R_0$).

25. The software of claim 24, comprising the additional step under step c of repeating steps c(i)-c(iv) for the second health plan ($H_1$), the second age range ($R_1$), and the first ailment ($A_0$), to determine the total number of sick days and partial impairment days ($d_1$) for the second age range ($R_1$).

26. The software of claim 25, comprising the additional step under step c of repeating steps c(i)-c(iv) for the second health plan ($H_1$), the first control percentage ($C_0$), the first ailment ($A_0$), and all the remaining age ranges ($R_2$-$R_k$) to determine total number of sick days and partial impairment days ($d_0$) for all the age ranges ($R_0$-$R_k$) with respect to the first ailment ($A_0$).

27. The software of claim 26, comprising the additional step under step c of repeating steps c(i)-c(iv) for the second health plan ($H_1$), a second ailment ($A_1$) and second control percentage ($C_1$), to determine the total number of sick days and partial impairment days ($d_1$) for all the age ranges ($R_0$-$R_k$) with respect to the second ailment ($A_1$).

28. The software of claim 24, comprising the additional steps under step c of repeating steps c(i)-c(iv) to determine the total number of sick days and partial impairment days ($d_2$-$d_k$) for ailments ($A_2$-$A_i$) and age ranges ($R_2$-$R_k$) for the second health plan ($H_1$).

29. The software of claim 28, comprising the additional steps under step c of summing the total number of sick days and partial impairment days ($d_0$-$d_k$) and saving the sum ($t_1$).

30. The software of claim 29 comprising: calculating the value (V) per member per day; calculating the second expected amount saved ($E_1$) by the using the second health plan ($H_1$) by multiplying V times $t_1$; and saving the expected amount saved ($E_1$).

31. The software of claim 30, comprising: providing the cost ($k_0$ and $k_i$), calculating the expected amount saved ($E_0$) while using the first health plan ($H_0$), and subtracting the cost ($k_0$ and $k_i$) of each health plan from the expected amount saved ($E_0$ and $E_1$), and saving the predicted amount of money ($\$_0$ and $\$_1$).

32. The software of claim 31, comprising the step of determining the more beneficial health plan for the organization by selecting the greater of the predicted amount of money ($\$_0$ and $\$_1$).

33. The software of claim 29, comprising the additional steps of repeating steps b and c to determine the total number of sick days and partial impairment days ($d_0$-$d_k$) for ailments ($A_0$-$A_i$) and age ranges ($R_0$-$R_k$) using information and data related to health plans ($H_2$-$H_j$) to determine the total number of sick days and partial impairment days ($d_0$-$d_k$) for health plans ($H_2$-$H_j$).

34. The software of claim 33, comprising the additional step under step c of summing the total number of sick days and partial impairment days ($d_0$-$d_k$) for health plans ($H_2$-$H_j$) to determine a list of sums ($t_2$-$t_j$).

35. The software of claim 34, comprising the step of: calculating the value (V) of each member per day; calculating the expected amount saved ($E_0$-$E_j$) by using each health plan ($H_0$-$H_j$) by multiplying V times results ($t_0$-$t_j$); and saving the amount saved ($E_0$-$E_j$).

36. The software of claim 35, comprising the steps of: providing the cost ($k_0$-$k_j$) of each health plan in step b; and subtracting the cost ($k_0$-$k_j$) of each health plan from the amount saved ($E_0$-$E_j$) to determine a list of the amount of money saved ($\$_0$-$\$_j$).

37. The software of claim 36, comprising the step of identifying the most profitable health plan for the organization to use by selecting the highest number from the list of the amount of money saved ($\$_0$-$\$_j$).

* * * * *